3,099,564
HIGHLY NUTRITIOUS FAT COMPOSITION
Chester M. Gooding, Westfield, N.J., assignor to Corn
Products Company, New York, N.Y., a corporation of
Delaware
No Drawing. Filed Aug. 29, 1960, Ser. No. 52,351
8 Claims. (Cl. 99—118)

This invention relates to a novel fat which is characterized by having a high essential fatty acid content. More particularly this invention pertains to margarines and shortenings having high essential fatty acid content. Still more particularly, this invention relates to fat compositions, such as margarines and shortenings, which have a high essential fatty acid content and which are characterized by having the physical characteristics of fats prepared by partial hydrogenation but which, unlike the latter, contain no partially hydrogenated fats and therefore no glycerides containing isomers of natural unsaturated fatty acids.

The essential fatty acids found in limped vegetable oils are important nutrients necessary for sound body health. The term "essential" means that these fatty acids, linoleic and linolenic, cannot be produced within the body but must be furnished preformed in the diet fed to the animal organism. Whereas, the active metabolic form of the essential fatty acids in the animal body is arachidonic acid, linoleic and linolenic acids are convertable to arachidonic acid in vivo, the transformation being expedited by vitamin $B_6$. Thus, any one of the three fatty acids mentioned can serve as a source of the essential fatty acids. From the practical standpoint, however, the only abundant and dependable dietary source is linoleic acid, found in rich supply in the limpid unhydrogenated domestic vegetable oils. However, hydrogenated fats previously known, prepared by the hydrogenation of the limpid unhydrogenated domestic vegetable oils, have been subject to frequent criticism in both the scientific and lay press since there is a decrease in essential fatty acid content and a development of isomers of fatty acids, e.g., trans oleic acid, as a result of hydrogenation of the vegetable oil.

It is therefore an object of this invention to provide novel fat compositions which are relatively rich in linoleic acid content. It is another object of this invention to provide margarines and shortenings of high essential fatty acid content which have the physical characteristics of products prepared by partial hydrogenation but which contain no partially hydrogenated fats. These and other objects will become apparent from the following detailed description.

Accordingly this invention provides novel fat compositions consisting essentially of a mixture of cottonseed stearine and an essentially completely hydrogenated interesterified base fat having a solids content index at 50° F. of from 55 to 70 and from 10 to 35 at 92° F.

I have discovered that cottonseed stearine, a by-product of cottonseed salad oil preparation, is composed of linoleic and oleic acids in essentially the same ratio as they occur in whole cottonseed oil, namely about 2:1 respectively. Still more surprising was the realization that cottonseed stearine, despite its lower iodine value and higher melting point, still contains as much as 40% or more of the linoleic acid component. This remarkable combination of physical and chemical characteristics is demonstrated in Table I below and makes cottonseed stearine ideally suitable as a major component of margarine and shortening fats. Of course it will be obvious to those skilled in the art that any tri-glyceride of the same general composition as cottonseed stearine, such as refined coffee bean oil, will also be suitable for use as a component in my compositions. For example safflower oil and saturated C–18 type fat might be esterinterchanged to provide a suitable component having the physical characteristics of cottonseed stearine in my compositions.

TABLE I

*Non-Hydrogenated Cottonseed Stearine*

Iodine number (Wijs) _____ 87.5
Percent pre-conjugated dienoic acids _____ 0.0
Percent pre-conjudgated trienoic acids _____ 0.4

Percent fatty acids in total fatty acids:
  Linolenic _____ 0.0
  Linoleic _____ 40.0
  Oleic _____ 21.2
  Saturated _____ 38.8

I also have discovered that cottonseed stearine possesses a unique chemical composition in that it is composed of fatty acids in specific rather than uniform or random distribution among its component glycerides. This is demonstrated by the fact that a deliberate alkoxide-catalyzed rearrangement of cottonseed stearine produces a new arrangement of the fatty acids in the mixed glycerides which results in a fat of wider melting range and higher Wiley melting point. This is demonstrated in Table II below:

TABLE II

| | Melting point, °F. | Setting point, °C. | Iodine value | Solids Content Index | | | |
|---|---|---|---|---|---|---|---|
| | | | | 50° F. | 70° F. | 80° F. | 92° F. |
| 1. Cottonseed stearine | 83.4 | 18 | | 32.9 | 2.4 | 1.3 | 0.0 |
| 2. Cottonseed stearine | 82.0 | | 91.4 | 28.5 | 18.5 | 2.7 | 0.1 |
| 3. Cottonseed stearine | 87.5 | | 85.8 | 32.2 | 1.5 | 0.7 | 0.0 |
| 4. Rearranged No. 1 | 110.8 | 25.7 | | 32.1 | 14.1 | 9.1 | 6.7 |
| 5. Rearranged No. 3 | 118.0 | 34.5 | 86.0 | 26.6 | 12.8 | 9.7 | 9.5 |

The interesterified base fats which are employed in the compositions of this invention form a class of fats possessing relatively high solids contents at temperatures below 92° F. These fats are made by rearranging appropriate mixtures of C–18 type fats such as cottonseed oil, soybean oil, etc. with C–12 type fats such as coconut, palm kernel, babassu fats, etc. The rearranged fat is finally hydrogenated to saturation. These fats contain essentially no isomers of unsaturated fatty acids. They may also be prepared by direct esterification of glycerol with a mixture of the desired gatty acids. Typical types of interesterified base fats suitable for combination with cottonseed stearine are described in Table III.

TABLE III

*Typical Values of Classes of Interesterified Base Fats*

| Type No. | Interesterified base fat | Melting point | Setting point | Iodine value | SCI 50° F. | 70° F. | 80° F. | 92° F. | 102° F. |
|---|---|---|---|---|---|---|---|---|---|
| 1A | 75 parts hydrogenated coconut oil / 25 parts hydrogenated cottonseed stearine | 96.5 / 99.0 | 31.5 / 33.5 | 1.0 | 61.5 | 46.0 | 36.0 | 10.0 | 0.0 |
| 1B | Saturated palm kernel fat (re-esterified) | 95.0 | 33 | 2.0 | 66 | 55 | 42 | 11 | 0.0 |
| 2A | 72 parts hydrogenated coconut oil / 28 parts hydrogenated palm kernel fat | 100 / 103 | 34 / 35 | 2.0 | 61.5 | 50.5 | 42 | 19.5 | 1.0 |
| 2B | 94 parts hydrogenated palm kernel oil / 6 parts hydrogenated cottonseed oil | 100 / 102 | 33 / 34 | 1.0 | 67.5 | 55 | 42 | 13 | 0.8 |
| 2C | 85 parts hydrogenated palm kernel fat, 15 parts hydrogenated cottonseed stearine | 102 | 34 | 1.0 | 68 | 59 | 50 | 21.5 | 3.0 |
| 3A | 63 parts hydrogenated coconut oil / 37 parts hydrogenated cottonseed stearine | 108 / 110 | 36 / 37 | 1.0 | 67 | 58 | 51.5 | 32.5 | 13.0 |
| 3B | 72 parts hydrogenated coconut oil, 28 parts hydrogenated soybean oil | 106 | 36 | 2.0 | 70 | 61 | 50 | 22 | 4 |
| 4A | 55 parts hydrogenated coconut oil / 45 parts hydrogenated cottonseed stearine | 112.5 / 114.5 | 37.5 / 39.5 | 2.0 | 67 | 62 | 57.5 | 43.0 | 25 |

There is another class of interesterified base fats which contain a small proportion of linoleic acid in its natural form. The linoleic acid is never subjected to hydrogenation although the major portion of the interesterified base fat is separately and completely hydrogenated. The natural linoleic acid in these newer interesterified base fats is incorporated either by addition of a minor portion of a glyceridic fat relatively high in linoleic acid content or it may become chemically integrated by catalyzed rearrangement of the saturated interesterified base fat with a minor amount of a non-hydrogenated fat containing a relatively high proportion of linoleic acid. These modified interesterified base fats may be employed in the present invention in the same manner as the completely hydrogenated interesterified base fats. In any case, the margarine fat will contain essentially no isomers of natural unsaturated acids resulting from partial hydrogenation.

It is understood by those skilled in the art of fat technology that cottonseed stearine is not a single substance but may vary according to the method of its separation from salad oil following crystallization or winterization. If the stearine is well-pressed by use of adequate pressure for a sufficient time, it will contain less entrapped whole cottonseed oil than one less dry due to too rapid, or for some other reason inefficient filtration. Hence it is within the skill of the formulator to compensate for dryness or oiliness of the cottonseed stearine by choice of a suitable interesterified base fat and its proportion in the blend.

Generally, the interesterified base fat should have a solids content at 92° F. of from about 10 to about 35, preferably 10 to 25, and at 50° F. of from about 55 to about 70. The fat composition of this invention will generally contain about 50 to 80 parts of cottonseed stearine preferably 60–80 parts of cottonseed stearine and from about 20–50 parts of interesterified base fat, preferably about 20–40 parts of interesterified base fat.

It is also within the purview of this invention to include a portion of a highly nutritious liquid oil such as whole cottonseed oil, whole corn or whole sunflower oil or the like in the fat composition of this invention. This is preferably accomplished by deliberately making the blend of cottonseed stearine and interesterified base fat too hard such that upon addition of the liquid oil the final product possesses an appropriate solids content index at 92° F. for best melting in the mouth.

In Table IV below representative characteristics for various conventional table spreads are illustrated.

TABLE IV

| | Melting point | Iodine value | Solids content index 50° F. | 70° F. | 80° F. | 92° F. | Percent linoleic acid |
|---|---|---|---|---|---|---|---|
| Margarine fat of the conventional plastic type | 96.1 | 83.0 | 26.7 | 15.1 | 10.2 | 3.2 | 12.3 |
| Butter fat: | | | | | | | |
| 1 | 94.3 | 36.4 | 30.6 | 11.4 | 7.5 | 2.7 | 3.5 |
| 2 | 94.8 | | 30.8 | 11.9 | 8.9 | 3.2 | |

Several representative compositions of this invention are illustrated in Table V below and a comparison of the linoleic acid present in the compositions of this invention with that present in the conventional table spreads shows that there is an increase in the linoleic acid of over 100% as compared to conventional margarine and an increase of six fold as compared to butter.

TABLE V

*Highly Nutritious Fat Compositions for Margarine*

| Blend | Percent cottonseed stearine | Percent interesterified base fat (Table II) | SCI 50° F. | 70° F. | 80° F. | 92° F. | Percent linoleic acid |
|---|---|---|---|---|---|---|---|
| 1 | 60 | 40 (type 1B) | 41.9 | 17.9 | 9.4 | 2.4 | 24 |
| 2 | 60 | 40 (type 1A) | 37.5 | 13.7 | 6.1 | 1.5 | 24 |
| 3 | 60 | 40 (type 2A) | 40.3 | 16.5 | 9.7 | 3.8 | 24 |
| 4 | 70 | 30 (type 3A) | 39.3 | 14.1 | 9.5 | 4.3 | 28 |
| 5 | 70 | 30 (type 2A) | 36.8 | 10.5 | 6.0 | 1.6 | 28 |
| 6 | 80 | 20 (type 3A) | 37.2 | 8.5 | 5.9 | 2.4 | 32 |
| 7 | 60 | 40 (type 3A) | 45.4 | 24.0 | 13.8 | 7.0 | 24 |
| 8 | (1) | 7 plus 20 pts | 31.5 | 13.6 | 9.8 | 4.6 | 30 |

1 80 pts. blend corn oil.

It is apparent from Table V that there is a rather desirable ratio in the blending of cottonseed stearine and interesterified base fats which result in physical properties characteristic of a table spread. For example, it is not possible to fully contribute sufficient solids to 80% of cottonseed stearine by 20% of Type 3A interesterified base fat in Blend 6. On the other hand, substitution of interesterified base fat Type 2C or 3B in place of 3A in Blend 4 would maintain a desirable high solids content at 70° F. and 80° F. and not exceed desirable solids content at 92° F.

Highly nutritious shortenings may be prepared by blending an interesterified base fat with cottonseed stearine. However, prior to blending with the interesterified base fat the stearine should first be rearranged as shown in Examples 4 and 5 of Table II.

Having thus provided a written description of the present invention and provided specific examples thereof, it should be understood that no undue restrictions or limitations are to be imposed by reason thereof but that the present invention is defined by the appended claims.

I claim:

1. A highly nutritious fat compositions consisting essentially of a mixture of about 50 to about 80 parts of cottonseed stearine and about 50 to about 20 parts of an essentially completely hydrogenated interesterified base fat having a solids content index at 50° F. of from about 55 to 70 and at 92° F. of from about 10 to 35, said composition having a Solids Content Index at 50° F. of from about 36 to about 45, at 70° F. of from about 8 to 17, at 80° F. of from about 6 to about 14, and at 92° F. of from about 1.5 to about 4.5.

2. A highly nutritious fat composition consisting essentially of from about 50 parts to 80 parts of cottonseed stearine and from 20 parts to 50 parts of an essentially completely hydrogenated interesterified base fat, said fat having a solids content index at 50° F. of from about 55 to 70 and at 92° F. of from about 10 to 25, said composition having a Solids Content Index at 50° F. of from about 36 to about 45, at 70° F. of from about 8 to 17, at 80° F. of from about 6 to about 14, and at 92° F. of from about 1.5 to about 4.5.

3. A highly nutritious fat composition consisting essentially of a mixture of about 40% to about 60% cottonseed stearine, about 40% to about 16% of an essentially completely hydrogenated interesterified base fat having a solids content index at 50° F. of from about 55 to 70 and at 92° F. of from about 10 to 25, and about 1% to about 16% of a whole liquid vegetable oil, said composition having a Solids Content Index at 50° F. of from about 36 to about 45, at 70° F. of from about 8 to 17, at 80° F. of from about 6 to about 14, and at 92° F. of from about 1.5 to about 4.5.

4. A highly nutritious margarine relatively rich in essential fatty acid content comprising a fat composition consisting essentially of a mixture of about 50 to about 80 parts of cottonseed stearine and about 50 to about 20 parts of an essentially completely dehydrogenated interesterified base fat having a solids content index at 50° F. of from about 55 to 70 and at 92° F. of from about 10 to 35, said fat composition having a Solids Content Index at 50° F. of from about 36 to about 45, at 70° F. of from about 8 to 17, at 80° F. of from about 6 to about 14, and at 92° F. of from about 1.5 to about 4.5.

5. A highly nutritious margarine relatively rich in essential fatty acid comprising a fat composition consisting essentially of from about 50 parts to 80 parts of cottonseed stearine and from about 20 parts to 50 parts of an essentially completely hydrogenated interesterified base fat, said fat having a solids content index at 50° F. of from about 55 to 70 and at 92° F. of from about 10 to 25, said fat composition having a Solids Content Index at 50° F. of from about 36 to about 45, at 70° F. of from about 8 to 17, at 80° F. of from about 6 to about 14, and at 92° F. of from about 1.5 to about 4.5.

6. A highly nutritious margarine relatively rich in essential fatty acid comprising a fat composition consisting essentially of a mixture of about 40% to about 60% cottonseed stearine, about 1 to about 16% of a whole liquid vegetable oil and about 40% to about 60% of an essentially completely hydrogenated interesterified base fat having a solids content index at 50° F. of from about 55 to 70 and at 92° F. of from about 10 to 25, said fat composition having a Solids Content Index at 50° F. of from about 36 to about 45, at 70° F. of from about 8 to 17, at 80° F. of from about 6 to about 14, and at 92° F. of from about 1.5 to about 4.5.

7. A shortening consisting essentially of a mixture of a rearranged cottonseed stearine and an essentially completely hydrogenated interesterified base fat having a solids content index at 50° F. of from about 55 to 70 and at 92° F. of from about 10 to 25, in a ratio of about 50 to 80 parts of said rearranged cottonseed stearine to about 50 to about 20 parts of interesterified base fat.

8. A highly nutritious fat composition consisting essentially of from about 50 parts to about 80 parts of a component selected from the group consisting of cottonseed stearine and vegetable oils having the physical characteristics of cottonseed stearine and having a linoleic acid to oleic acid ratio of about 2 to 1 and from about 50 parts to about 20 parts of an essentially completely hydrogenated interesterified base fat having a solids content index at 50° F. of from about 55 to 70 and at about 92° F. of from about 10 to about 35, said composition having a solids content index at 50° F. of from about 36 to about 45, at 70° F. of from about 8 to about 17, at 80° F. of from about 6 to about 14, and at 92° F. of from about 1.5 to about 4.5.

References Cited in the file of this patent

UNITED STATES PATENTS

| 2,890,959 | Phillips | June 16, 1959 |
| 2,936,238 | Weiss | May 10, 1960 |
| 3,026,207 | Murray | Mar. 20, 1962 |

OTHER REFERENCES

Eckey: "Vegetable Fats and Oils," 1954, Reinhold Publishing Corp., New York, pages 287, 514, 654, 746, 776, 779.

UNITED STATES PATENT OFFICE

CERTIFICATE OF CORRECTION

Patent No. 3,099,564                          July 30, 1963

Chester M. Gooding

It is hereby certified that error appears in the above numbered patent requiring correction and that the said Letters Patent should read as corrected below.

Column 1, line 21, for "limped" read -- limpid --; line 28, for "convertable" read -- convertible --; column 2, line 7, after "and" insert -- a --; line 63, for "gatty" read -- fatty --; column 4, Table V, last line of the table and the footnote thereof, for

| 8 | (1) | 7 plus 20 pts | 31.5 | 13.6 | 9.8 | 4.6 | 30 |

¹80 pts. blend corn oil.

read

| 8 | 80 pts. blend 7 + 20 pts. corn oil | 31.5 | 13.6 | 9.8 | 4.6 | 30 | column 5, line 42, for "dehydrogenated" read -- hydrogenated --.

Signed and sealed this 25th day of February 1964.

(SEAL)
Attest:

ERNEST W. SWIDER                              EDWIN L. REYNOLDS
Attesting Officer                         Acting Commissioner of Patents